Oct. 6, 1964
H. SCHAEVITZ ETAL  3,152,310
DIFFERENTIAL TRANSFORMER ACCELEROMETER WITH
TEMPERATURE COMPENSATION
Filed Jan. 18, 1960
2 Sheets-Sheet 1
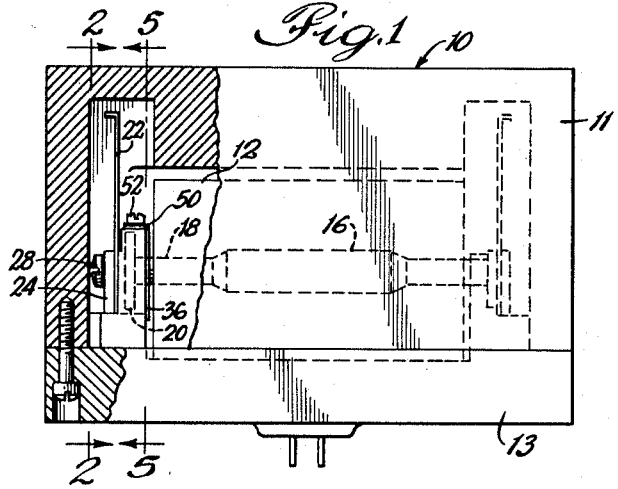
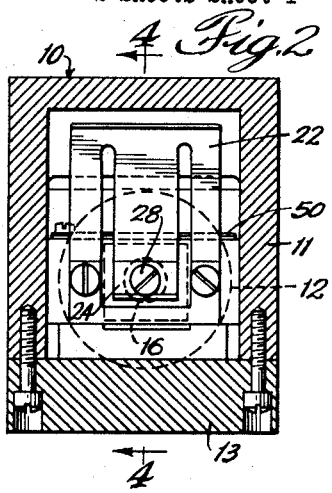
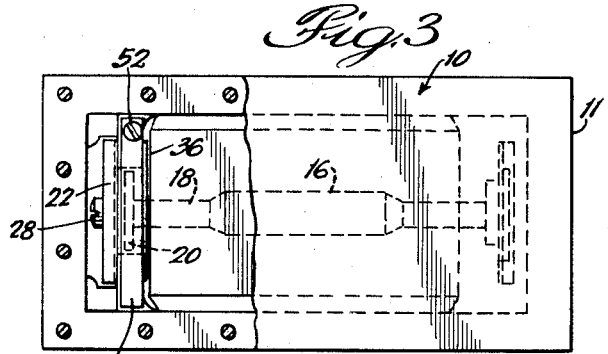
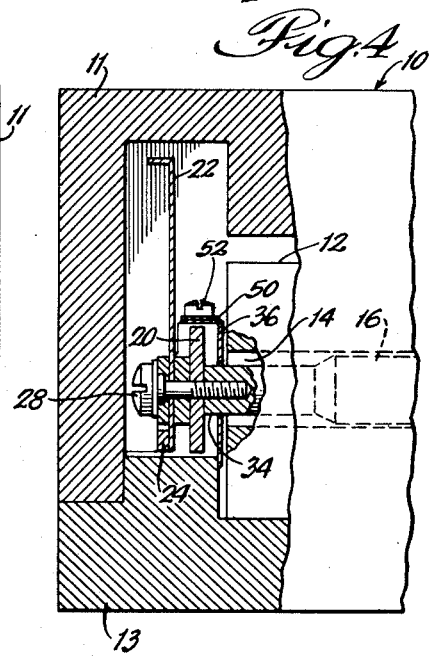
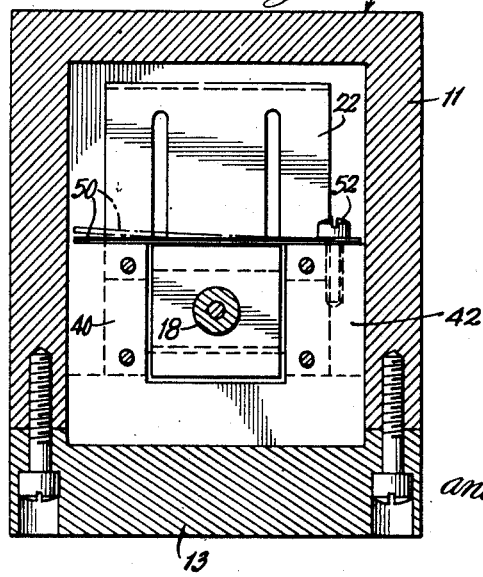
INVENTORS:
Herman Schaevitz
and Lawrence Moskowitz,
BY Louis Bernat
ATTORNEY

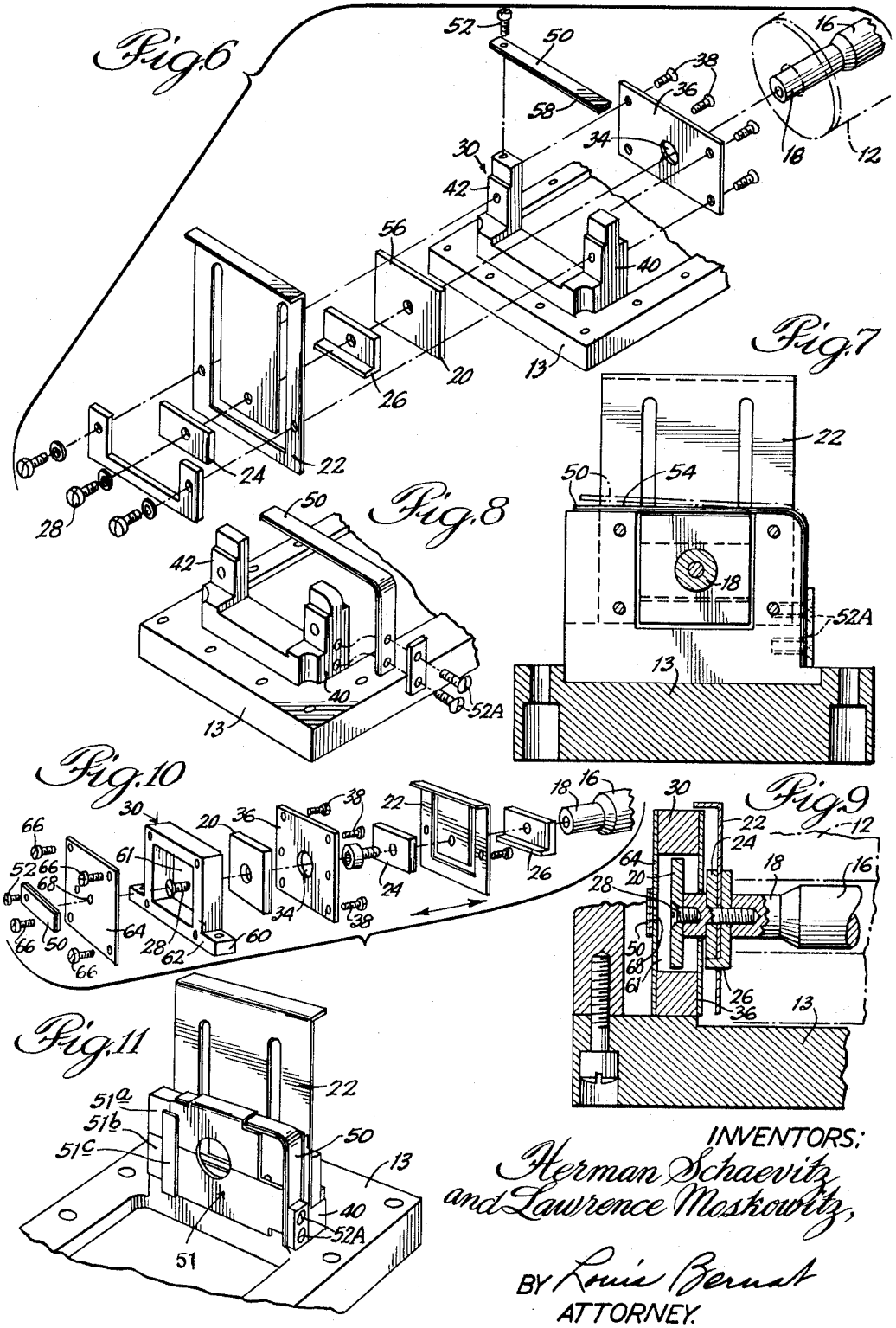

United States Patent Office 3,152,310
Patented Oct. 6, 1964

3,152,310
DIFFERENTIAL TRANSFORMER ACCELEROMETER WITH TEMPERATURE COMPENSATION
Herman Schaevitz, Collingswood, and Lawrence Moskowitz, Camden, N.J., assignors to Schaevitz Engineering, Merchantville, N.J., a corporation of New Jersey
Filed Jan. 18, 1960, Ser. No. 3,021
4 Claims. (Cl. 336—30)

This invention relates to improvements in differential transformers and more particularly to an improved differential transformer accelerometer coupled with automatic temperature compensation.

The object of this invention is to provide an improved structure for a linear variable differential transformer employing a novel compensated damping structure which is utilized in the measurement of linear acceleration over wide climatic conditions wherein the A.-C. carrier output of the accelerometer is a stepless, highly linear function of the applied acceleration and the output being accurately maintained in proportion to the continuous or variable acceleration.

In general, these accelerometers are viscous-fluid damped and embody an extremely high degree of precision and ruggedness when used in aircraft, missile and space vehicle applications.

An accelerometer system utilizing a seismic mass and a force restoring system, such as a spring beam configuration should generally be damped. A method of accomplishing this damping is to surround the moving parts with a viscous fluid. A disadvantage in these systems is that the viscosity of the fluid changes with the temperature and thereby changes the critical damping effect. Various compositions of hydraulic damping fluids, having a relatively small change of viscosity with reference to the change in temperature, have been used for this purpose. Various low vapor pressure oils, synthetic organic hydraulic compounds and the organo-silicon compounds have been used. These hydraulic fluids include the silicon oils, such as the polymethylsiloxanes, the linear polyethylsiloxanes, the linear polymethylphenylsiloxanes, the tetrathoxysilanes and other homologues.

The utilization of these hydraulic fluids will tend to reduce the temperature effect, but in no manner does it eliminate it. In conducting precise measurements of linear acceleration, utilizing the conventional differential transformer in such viscous fluid damped systems, it has been found that for incremental increases in temperature, there is a substantial decrease in the output current.

Furthermore, since the A.-C. carrier output from the accelerometer is a stepless and highly precise linear function of the applied acceleration, the output must be maintained proportionately, and therefore the temperature gradient compensation must be likewise co-ordinated with the stepless function of the accelerometer.

Another object of the invention is to construct an improved differential transformer accelerometer with temperature compensation wherein the size and mass configuration are small when used in missile applications which are subject to a wide range of temperature variations. Generally, these accelerometers should be unaffected by ambient temperature variations in a range of about —80° Fahrenheit to 300° Fahrenheit. Previously, accelerometers utilized a substantial amount of thermal insulation as well as a thermostatically controlled heating element sealed inside the accelerometer housing to reduce the temperature effect.

The novel features which are characteristic of the invention are set forth with greater particularity in the appended claims. The invention itself, however, both as to its organization and operation, together with further objects and advantages thereof, will best be understood by reference to the following detailed description when considered with the accompanying drawings wherein:

FIGURE 1 is a side longitudinal view, partly in section of the linear transformer accelerometer;

FIGURE 2 is a cross sectional view, taken along line 2—2 as shown in FIGURE 1;

FIGURE 3 is a top plan view, partly in section, of the differential transformer accelerometer;

FIGURE 4 is an enlarged, sectional view taken along line 4—4 of FIGURE 2;

FIGURE 5 is an enlarged, cross sectional view taken along line 5—5 of FIGURE 1, showing a temperature compensation element;

FIGURE 6 is an exploded isometric projection illustrating in greater detail one illustrative embodiment of the temperature compensation element;

FIGURE 7 is an alternative embodiment, illustrating the temperature compensation element in a cross sectional view similar to the view shown in FIGURE 5;

FIGURE 8 is an isometric projection, illustrating the structure as shown in FIGURE 7, in exploded arrangement;

FIGURE 9 is a cross sectional view of another illustrative embodiment, illustrating the piston arrangement, coupled with an external temperature compensating vane;

FIGURE 10 is an exploded isometric projection of the structure of the transformer compensation system, as shown in FIGURE 9; and FIGURE 11 is an enlarged view of the bimetallic element, similar to the structure as shown in FIGURE 8 with an additional shutter element affixed for restricting the flow of the damping fluid.

Fluid damping is considered the result of basically two independent hydraulic phenomena. In one instance, friction is developed between the fluid at rest and the moving structure; and the other phenomenon is created by the pumping action of the surfaces, which generally is perpendicular to the motion of the seismic mass, and by the consequent friction of the displaced fluid against itself and against both the moving and stationary structures.

If the pumping action is increased and the pumped viscous fluid is caused to pass through a narrow passage, orifice or port, the frictional forces and consequent pumping action is greatly increased. In addition, the hydraulic pumping action can be substantially increased by confining the moving pump surfaces. If the hydraulic pumping action or the passage cross section is varied proportionately with the temperature, it is possible to accommodate the change in viscosity and thus achieve a more constant pumping action with changing temperatures, thereby modifying the trend, or even reversing it.

Wherein the drawings, for the purpose of illustration, show the preferred embodiments of the invention, and, wherein similar reference characters denote corresponding parts throughout the views, the numeral 10 generally designates the accelerometer unit which may be adapted to any type of acceleration measurements by means of suitable mountings (not shown). The accelerometer unit 10 includes a fabricated housing 11, formed and machined of light weight material, such as aluminum, magnesium, titanium or the like, and a base 13. Centrally disposed within the housing 10 is an electrical coil cylinder 12, having an axial bore 14 therein. An armature or core 16 is disposed within said bore 14, and said core 16 is generally fabricated of magnetic material, such as nickel, iron and various composite alloyed magnetic materials. Extending linearly from the core 16 and forming a part thereof is a core extension 18, which may also be identified as a piston rod 18.

Referring to FIGURE 6, the piston rod 18 is coupled to the piston element 20 and is affixed to the restoring beam 22 by means of a beam clamp 24 and to the inter-locking beam member 26 by means of a screw fastener 28. It can be seen that the piston rod 18 traverses an opening 34 in the end plate 36 of the piston pump, generally shown by numeral 30.

The end plate 36 is clamped by means of screws 38 to the machined outer cylinder walls 40 and 42. The piston element 20 advantageously is designed for precise clearance of about thousandths of inches around the inner lower and side wall surfaces of the piston pump chamber 30. In addition, similar clearances are provided where the piston rod 18 passes through opening 34 of the end plate.

The piston pump structure 30 is clamped to the accelerometer restoring beam leaf member 22, and the physical configuration of this restoring force coupled with the general accelerometer structure provides the basis of a series of linear differential accelerometers having wide acceleration ranges.

Referring now specifically to the temperature compensation embodiment, as illustratively shown in FIGURE 6, a bimetallic vane 50 is mounted at one end thereof, by means of a screw fastener 52, to the upper portion of the cylinder wall 42. The leaf configuration of the bimetallic vane 50 is arranged so that it lifts as the temperature decreases. Normally, as the temperature decreases, the fluid viscosity increases and the damping process thereby increases. In this instance, the vane 50 lifts and by-passes the narrow fluid passage 54, wherein such passage 54 is defined as the opening, port or orifice which is positioned between the upper surface 56 of the piston 20 and the lower surface 58 of the vane 50. The damping effect is decreased, thus counter-acting the change in viscosity proportionally to the change in temperature.

FIGURES 7 and 8 illustrate modifications of the vane 50 structure wherein the right angle variation provides a greater change in the vane position because of the greater vane length. In addition, the small angle provided at the clamp point causes the entire portion of the vane 50, which is the continuation of the cylinder walls 40 and 42, to create a substantially vertical opening rather than to merely pivot about the clamp screw 52. It can be seen in FIGURES 7 and 8 that the vane 50 advantageously is clamped to the side wall 40 by means of fastening screws 52A.

FIGURES 9 and 10 illustrate an alternate embodiment of the invention which utilizes a separate piston chamber 60. Advantageously piston chamber 60 may have an internal configuration similar to the piston configuration and machined in such a manner that there is a hydraulic sliding fit between the outer surfaces of the piston 20 and the inner side walls of the piston chamber 60. Those skilled in the art will appreciate that the piston configuration may either be square, round, rectangular or any other geometric shape. The piston rod 18 is positioned through an end plate 36 and connected to the terminal end of said segmented rod 18 by means of a screw fastener 28. End plate 36 then is attached by means of mounting screws 38 to the rearward side of the piston chamber 60.

An orifice plate 64 is affixed on the outer side 62 of the piston chamber 60 by means of screw fasteners 66. Positioned in said orifice plate 64 is a passage, port or orifice 68 which inter-connects the inter-chamber 61, thereby defining the piston pump structure 30.

The vane element 50, as shown, advantageously takes the form of a bimetallic leaf arrangement and by utilizing the characteristics of a bimetallic element, the temperature changes will vary the flow of the damping fluid through the restricted orifice 68 in a manner dependent upon the variations in temperature.

It is to be noted that in the embodiment illustrated in FIGURES 9 and 10, the vane 50 is of leaf configuration, although it is understood that a shutter type of arrangement may be utilized instead of the leaf arrangement as shown. It will further be understood that there are many other arrangements which may be utilized to advantage in accordance with the invention, such as inserting a plunger within orifice 68 which, in turn, would be connected to a temperature compensating element adapted to vary with the change in temperature, thus varying the flow through the orifice 68.

FIGURE 11 illustrates an additional embodiment wherein a shutter structure 51 having an upper shutter vane 51(a) attached to the bimetallic vane 50 and a lower shutter vane 51(b) mounted in a complementary fixed position is used to provide a more precise control of the flow of the damping fluid. The guide member 51(c) is attached to the lower shutter vane 51(b) to provide alignment.

Obviously many modifications and variations of the present invention are possible in the light of the above teachings. It is therefore to be understood that various modifications and alternative constructions may be practiced without departing from the true spirit and scope of the invention. Accordingly, it is intended that the appended claims cover all such modifications and alternative constructions as fall within their true spirit and scope.

What is claimed as the invention is:

1. In an electrical differential transformer of the type comprising a housing defining a first chamber within which is disposed an electrical coil and a linearly operable seismic mass armature movable within a bore in said coil, said chamber being filled with damping fluid, the improvement of automatically compensated fluid brake damping means for said seismic mass armature comprising cylinder means adapted to communicate with said chamber and having damping fluid therein positioned adjacent one end of said linearly operable seismic mass armature, said cylinder means including a plurality of cylinder walls defining a central opening therein and further defining a fluid opening to facilitate the flow of damping fluid through said cylinder means, a piston brake member positioned within said central opening of said cylinder means, a piston rod connecting said linearly operable seismic mass armature to said piston brake member for effecting linear movement of the piston brake member in the damping fluid in response to the linear motion of the seismic mass, and temperature sensitive compensation means including a vane element which cooperates with the cylinder means to define a damping piston chamber, said temperature compensation means being positioned on said cylinder means and external to said electrical coil and seismic mass armature for varying the fluid resistance to the linear motion of said piston brake member by varying the resistance to the flow of said damping fluid from said damping chamber to said first chamber in accordance with variations in temperature, thereby providing automatic temperature compensation for the damping of said linearly operable seismic mass armature, the positioning of said temperature sensitive compensation means separate and remote from said seismic mass armature permitting adjustment and testing of said differential transformer independently or said automatically compensated fluid brake damping means.

2. A differential transformer in accordance with claim 1 wherein said cylinder means comprises a plurality of walls defining a partially enclosed cylinder within which said piston is linearly moved, and said compensation means comprises a temperature sensitive member forming a wall of said cylinder to enclose said piston brake member, one end of said compensation means being secured to a wall of said cylinder means and the other end of said compensation means being freely movable to vary the degree of cylinder enclosure for the piston brake member in accordance with the temperature changes to thereby provide a correspondingly varying degree of resistance to the flow of damping fluid through said cylinder.

3. A differential transformer comprising the combination of a housing defining a first chamber; electrical coil means within said chamber; a linearly operable seismic mass comprising a magnetic armature positioned within said coil means; damping fluid within said housing for damping the linear motion of said armature relative to said coil means; automatically compensated fluid brake damping means for said armature comprising a cylinder means defining a damping chamber and a piston brake member positioned adjacent one end of said armature and movable within said damping chamber, a piston rod connecting said armature to said piston brake member for effecting linear movement of the piston brake member in the fluid in response to the linear motion of the armature, a thermostatic element affixed to said cylinder means at a position external to said coil means and said armature for varying the flow of fluid therethrough, and compensation means operatively coupled to said thermostatic element for automatically varying the resistance to fluid flow in the flow passage between the damping chamber and said first chamber by changing the effective area of the restricted flow passage in accordance with variations in temperature to provide automatic temperature compensated fluid piston braking of said armature within said housing.

4. A differential transformer in accordance with claim 3 wherein said compensation means comprises a movable vane positioned at one side of said cylinder such that the movement of said vane in response to temperature variations serves to vary the cross-sectional area of said cylinder in a relative manner to vary the fluid braking effect on said seismic mass.

References Cited in the file of this patent

UNITED STATES PATENTS

| | | |
|---|---|---|
| 2,332,994 | Draper | Oct. 26, 1943 |
| 2,831,670 | Bourns et al. | Apr. 22, 1958 |
| 2,945,378 | Martin | July 19, 1960 |